United States Patent
Howlett, III et al.

(10) Patent No.: US 12,296,705 B2
(45) Date of Patent: May 13, 2025

(54) SYSTEMS AND METHODS FOR ON-BOARD EV CHARGER AND REGENERATIVE BRAKING

(71) Applicant: Iontra Inc, Centennial, CO (US)

(72) Inventors: John Richard Howlett, III, Centennial, CO (US); David Kessner, Denver, CO (US)

(73) Assignee: Iontra Inc, Centennial, CO (US)

( * ) Notice: Subject to any disclaimer, the term of this patent is extended or adjusted under 35 U.S.C. 154(b) by 337 days.

(21) Appl. No.: 17/955,276

(22) Filed: Sep. 28, 2022

(65) Prior Publication Data

US 2023/0099305 A1 Mar. 30, 2023

Related U.S. Application Data

(60) Provisional application No. 63/249,563, filed on Sep. 28, 2021, provisional application No. 63/249,567, filed on Sep. 28, 2021.

(51) Int. Cl.
*B60L 53/60* (2019.01)
*B60L 7/10* (2006.01)
(Continued)

(52) U.S. Cl.
CPC ............. *B60L 53/60* (2019.02); *B60L 7/10* (2013.01); *B60L 58/24* (2019.02);
(Continued)

(58) Field of Classification Search
CPC .. B60L 53/60; B60L 58/24; B60L 7/10; B60L 2210/30; H02J 7/00032; H02J 7/0071; H02M 7/23873
See application file for complete search history.

(56) References Cited

U.S. PATENT DOCUMENTS

| | | | | |
|---|---|---|---|---|
| 5,298,849 A | * | 3/1994 | Drexel | B60L 53/62 320/109 |
| 2010/0076615 A1 | * | 3/2010 | Daniel | H02J 4/00 703/2 |

(Continued)

OTHER PUBLICATIONS

International Searching Authority, International Search Report and Written Opinion, issued in connection with International Application No. PCT/US2022/045083, mailed Dec. 30, 2022 (8 pages).

*Primary Examiner* — Edwin A Young
(74) *Attorney, Agent, or Firm* — Gregory P. Durbin; Polsinelli PC

(57) ABSTRACT

Systems, circuits, and methods are disclosed herein for charging (recharging) one or more batteries of an electric vehicle through an on-board charge shaping (or tuning) circuit. The charge shaping circuit may alter the charge signal received from a charging station and/or a regenerative charge signal from the vehicle motor based on one or more charge conditions at the battery. The charge shaping circuit and/or a motor controller/inverter of the electric vehicle may include circuitry that is controllable to generate a shaped power signal in a similar manner as above, with or without the charge shaping circuit discussed above. In some implementations, one or more heat transfer systems may be included to transfer heat generated from the battery charging system to the battery.

21 Claims, 8 Drawing Sheets

(51) Int. Cl.
*B60L 58/24* (2019.01)
*H02J 7/00* (2006.01)
*H02M 7/5387* (2007.01)

(52) U.S. Cl.
CPC ...... *H02J 7/00032* (2020.01); *H02J 7/00714* (2020.01); *B60L 2210/30* (2013.01); *H02M 7/53873* (2013.01)

(56) References Cited

U.S. PATENT DOCUMENTS

| | | | |
|---|---|---|---|
| 2015/0311724 A1* | 10/2015 | Callanan | H02J 50/12 307/104 |
| 2017/0003354 A1 | 1/2017 | Morrison et al. | |
| 2017/0302088 A1 | 10/2017 | Tkachenko et al. | |
| 2018/0043778 A1 | 2/2018 | Murbach et al. | |
| 2018/0105055 A1* | 4/2018 | Chai | H02J 7/007 |
| 2018/0375134 A1 | 12/2018 | Fuchs et al. | |
| 2022/0085633 A1 | 3/2022 | Konopka | |

* cited by examiner

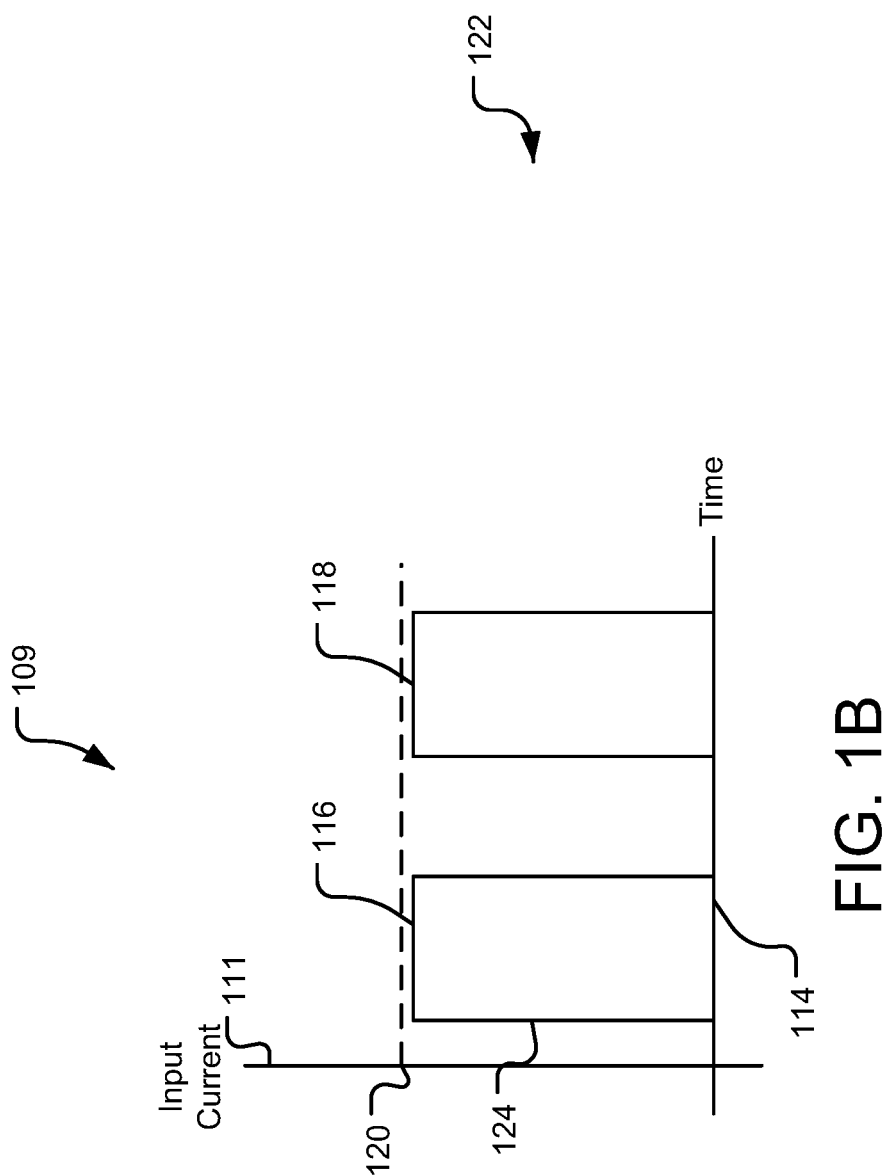

SYSTEMS AND METHODS FOR ON-BOARD EV CHARGER AND REGENERATIVE BRAKING

CROSS-REFERENCE TO RELATED APPLICATION

This application is related to and claims priority under 35 U.S.C. § 119 from U.S. Provisional Patent Application No. 63/249,567 filed Sep. 28, 2021 entitled "Systems and Methods for On-Board EV Charger and Regenerative Breaking," and to U.S. Provisional Patent Application No. 63/249,563 filed Sep. 28, 2021 entitled "Systems and Methods for On-Board EV Charger and Battery Temperature Management," both of which are hereby incorporated by reference in their entirety.

TECHNICAL FIELD

Embodiments of the present invention generally relate to systems and methods for charging of one or more batteries, and more specifically for a generation of a tunable, high-efficiency and/or high-rate charging signal to charge one or more batteries or cells of an electric vehicle.

BACKGROUND AND INTRODUCTION

Rechargeable batteries are limited by finite battery capacity and must be recharged upon depletion. Recharging a battery of a portable device may be inconvenient as the powered device must often be stationary during the time required for recharging the battery. In the case of vehicle battery systems for electric vehicles and similarly larger capacity systems, recharging can take hours. For example, many electric vehicle owners install an electric vehicle charging station at the owner's residence for charging the battery system of the vehicle overnight while the vehicle is parked. Other charging stations may be placed in various locations, such as adjacent conventional gas stations, grocery stores, parking lots, etc., for recharging the vehicle battery for shorter timeframes, but still require the vehicle to be stationary and plugged into the charger for a long period of time. As such, charging a high-capacity vehicle battery takes a significant amount of time.

A significant effort has been put into developing charging technology that reduces the time needed to recharge the battery. However, rapid recharging systems typically require costly high-power electronics for the delivery of high levels of charging current, along with current limit and over-voltage circuitry for preventing over-charging that may result in damage to the working battery being recharged. Moreover and importantly, higher current fast charging solutions can further damage the battery, particularly as the percentage of battery charge increases, such that high current fast charging must often be limited as the percentage of the battery charge increases past about 50%. Slower recharging systems are less costly, but prolong the recharging operation, undermining the basic objective of a quick return to service of the electric vehicle.

Battery systems also tend to degrade over time based on the charge and discharge cycling of the battery system, the depth of discharge and overcharging, among other possible factors. Thus, like the speed of charging, efforts are made to optimize charging to maximize battery life while using as much of the battery capacity as possible. Often these objectives are at odds, and charging systems are designed to optimize some attributes at the expense of others.

It is with these observations in mind, among others, that aspects of the present disclosure were conceived and developed.

SUMMARY

One aspect of the present disclosure relates to a system of charging an electrochemical device of an electric vehicle. The system may include a charge signal shaping circuit receiving a charge signal via a charge station interface and controlling the shape of the charge signal for the electrochemical device of the electric vehicle based on an obtained harmonic associated with a value representative of a flow of electrical current to the electrochemical device.

Another aspect of the present disclosure relates to a method for charging an electrochemical device of an electric vehicle. The method may include the operations of receiving, from a charge station interface of the electric vehicle in electrical communication with a charge station, an electrochemical device charge signal and controlling the shape of the charge signal for the electrochemical device of the electric vehicle based on an obtained harmonic associated with a value representative of a flow of electrical current to the electrochemical device.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

FIG. 1B is a signal diagram of a direct current voltage or current signal for recharging a battery of an electric vehicle.

DETAILED DESCRIPTION

Systems, methods, and devices for charging a battery or battery system for an electric vehicle or other type of electrical system with a battery are disclosed herein. The term "battery" in the art and herein can be used in various ways and may, in some instances, refer to an individual cell having an anode and cathode separated by an electrolyte, as well as a collection of such cells connected in various arrangements. A battery or battery cell is a form of electrochemical device. Batteries generally comprise repeating units of sources of a countercharge and first electrode layers separated by an ionically conductive barrier, often a liquid or polymer membrane saturated with an electrolyte. These layers are made to be thin so multiple units can occupy the volume of a battery, increasing the available power of the battery with each stacked unit. Although many examples are discussed herein as applicable to a battery, it should be appreciated that the systems and methods described may apply to many different types of batteries ranging from an individual cell to batteries involving different possible interconnections of cells, such as cells coupled in parallel, series, and parallel and series. For example, the systems and methods discussed herein may apply to a battery pack of an electric vehicle or other electrically powered device or system comprising numerous cells arranged to provide a defined pack voltage, output current, and/or capacity. Moreover, the implementations discussed herein may apply to different types of electrochemical devices, such as various different types of lithium batteries including but not limited to lithium-metal and lithium-ion batteries, lead acid batteries, various types of nickel batteries, and solid state batteries, to name a few. In the context of a vehicle battery, hundreds and sometimes thousands of cells may be interconnected to provide some specified range and current delivery capacity to meet the performance objectives of any given vehicle design. The various implementations discussed herein may also apply to different structural battery arrangements such as cylindrical cells, pouch cells, and prismatic cells.

Figure 1A:
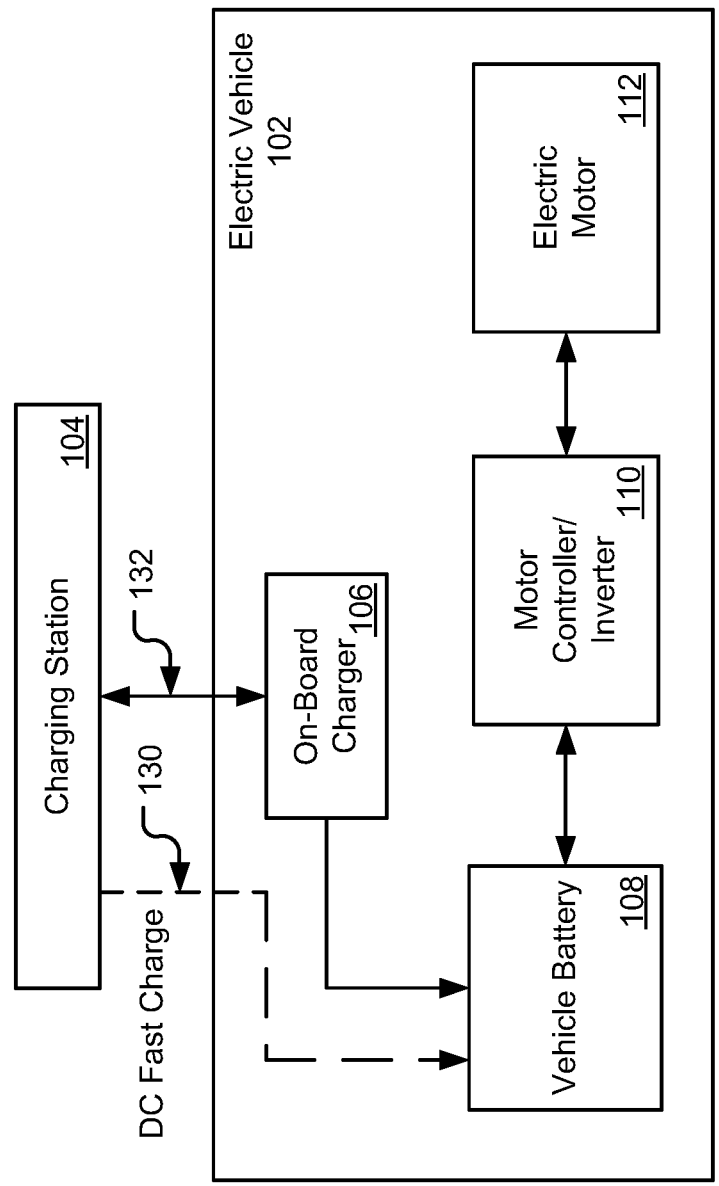
FIG. 1A is a first schematic diagram of a first electric vehicle charging system.

At a high level, shown in FIG. 1A, charging of an electric vehicle's 102 battery system 108 may involve interfacing the electric vehicle with a charging station 104 that supplies a charge current to provide charge energy to a battery system 108 of the vehicle. Many charging stations 104 may provide, in one instance, an alternating current (AC) charge signal to charge the vehicle battery 108 through an on-board charger 106. The on-board charger 106 may convert the received AC charge signal in a direct current (DC) or direct voltage signal and provide the converted charge signal to the battery 108. In another instance, the charging station 104 may provide a high-energy, DC fast-charge 130 signal for rapid charging of the battery 108. Such a fast-charge 130 signal may be provided directly to the vehicle battery 108 (and thereby bypassing the on-board charger 106) to further decrease the time for charging. Although several components of the recharging system 100 are illustrated in FIG. 1A, it should be appreciated that other components of the system, such as a current meter, volt-meter, controller, etc., are not illustrated and may be included.

In some instances, the on-board charger 106 may negotiate or otherwise request a charge signal from the charging station 104 when the electric vehicle 102 is plugged into or other interfaced with the charging station. The negotiation may instruct the charging station 104 to provide a DC fast-charge 130 signal or typical charge signal 132 to the on-board charger 106. In general, the application of the power signal to the electrodes of the battery 108 causes a reverse flow of electrons through the battery to replenish the stored concentration of charge carriers (such as lithium ions) at the anode.

During operation of the vehicle 102, the electric vehicle battery 108 delivers power to drive the electric vehicle. In particular, the vehicle battery 108 may provide a power signal to a motor controller/inverter 110 which may convert the power signal to a signal that drives the electric motor 112. The signal depends on the type of motor. In some instances, the motor controller/inverter 110 may convert the power signal to an AC signal to drive the electric motor 112. In other instances, the motor controller/inverter 110 may generate a three-phase AC power signal for powering the electric motor 112. Regardless, the electric motor 112 may be powered by the vehicle battery 108 to propel the electric vehicle 102. Providing power to the motor 112 to propel the vehicle may cause the battery 108 to become depleted, requiring recharging of the battery.

Pulse charging has been explored for battery charging generally. FIG. 1B illustrates a graph 109 of a direct current voltage signal 122 that may be applied to charge a battery. The graph illustrates an input current 111 versus time 114 of the charge signal 122. In general, for some conventional pulse charging, a power signal may be controlled to provide a repeating square-wave (illustrated as pulse 116 followed by pulse 118) signal to a battery. For example, the DC fast-charge 130 signal may comprise a series of pulses as illustrated in FIG. 1B to charge the vehicle battery 108. The peaks of the square-wave pulses 116, 118 may be less than or equal to a current threshold value 120 corresponding to operational constraints of a charger, the battery system 108, and/or a current or voltage component of the power signal. Typical charge signal used to recharge a battery 108 may apply a charging signal during a charging period, with a rest period of some duration between application of the charging signal to the anode of the battery.

Figure 2:
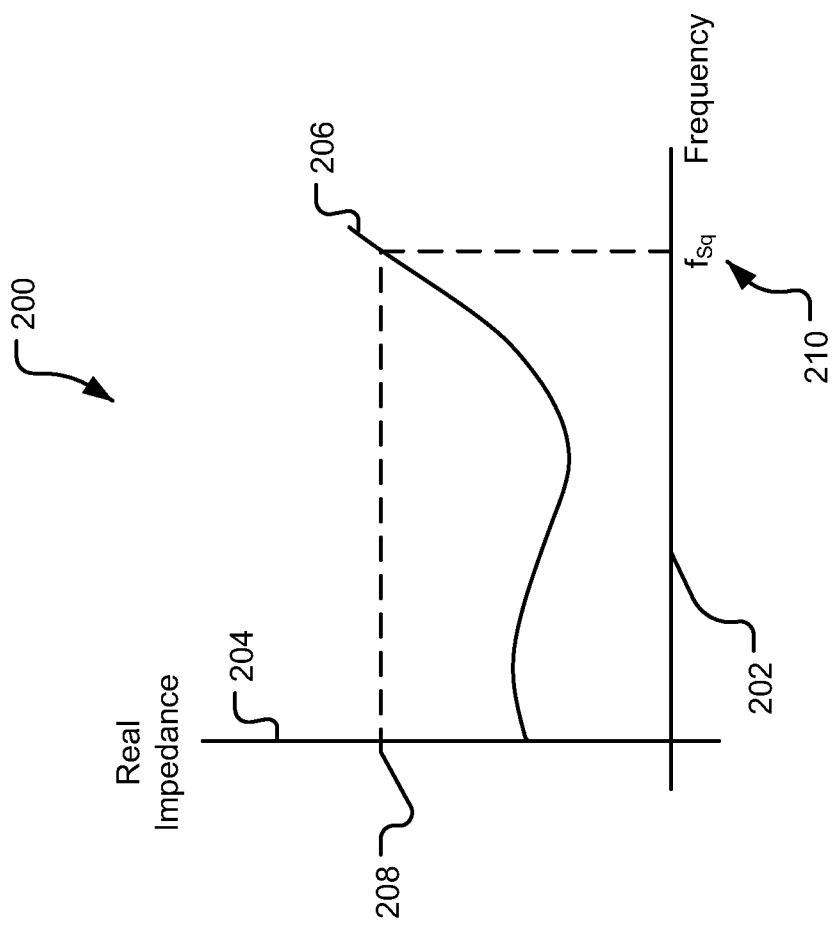
FIG. 2 is a graph of estimated real impedance values of a battery to corresponding frequencies of a charge signal applied to the battery in accordance with one embodiment.

In some instances, however, applying a square-wave charge signal 122 to recharge a battery 108 may degrade the life of the battery under recharge or may introduce inefficiencies in the recharging of the battery leading to longer charge times. For example, the abrupt application of charge current (i.e., the sharp leading edge 124 of the square-wave pulse 116) to the electrode (typically the anode) of the battery 108 may cause a large initial impedance across the battery terminals. In particular, FIG. 2 illustrates a graph of estimated real impedance values of a battery 108 to corresponding frequencies of a recharge signal applied to the battery in accordance with one embodiment. In particular, the graph 200 illustrates a plot 206 of real impedance values (axis 204) versus a logarithmic frequency axis (axis 202) of frequencies of an input signal to the battery 108. More particularly, the plot 200 illustrates real impedance values across the electrodes of a battery 108 at the various frequencies of a recharge power signal used to recharge the battery. The shape and measured values of the plot 200 may vary based on several factors, including but not limited to battery type, state of charge of the battery, operational constraints of the battery, heat of the battery, and the like. However, a general understanding of the characteristics of a battery under charge may be obtained from the plot 206. In particular, real impedance values experienced at the electrodes of the battery 108 may vary based on the frequency of the power charge signal provided to the battery, with a general sharp increase in real impedance values 206 at high frequencies. For example, an input power signal to the battery 108 at frequency $f_{Sq}$ 210 may introduce a high real impedance 208 at the battery 108 electrodes, resulting in a loss of transfer of power to the battery, lessening the efficiency of the charging process and/or damaging portions of the battery under charge.

Returning to the square-wave charge signal 122 of FIG. 1B, large frequencies of the signal may be present at the corners of the square-wave pulse 116. In particular, the rapid changes in the charge signal (such as the leading edge 124 of the pulse 116) to the battery 108 may introduce noise comprised of high-frequency harmonics, such as at the leading edge of the square-wave pulse, the tail edge of the square-way pulse, and during use of conventional reverse pulse schemes. As shown in the graph 200 of FIG. 2, such high harmonics result in a large impedance at the battery electrodes. This high impedance may result in many inefficiencies and degradation of the battery, including capacity losses, heat generation, and imbalance in electro-kinetic activity throughout the battery, undesirable electro-chemical response at the charge boundary, and degradation to the materials within the battery 108 that may damage the battery and degrade the life of the battery. Further, cold starting a battery with a fast pulse introduces limited faradaic activity as capacitive charging and diffusive processes set in. During this time, proximal lithium will react and be quickly consumed, leaving a period of unwanted side reactions and diffusion-limited conditions which negatively impact the health of the cell and its components. These and other inefficiencies are particularly detrimental during a fast recharging of the battery 108 where relatively higher currents are often involved.

Systems, circuits, and methods are disclosed herein for charging (recharging) one or more batteries. The terms charging and recharging are used synonymously herein. Through the systems, circuits, and methods discussed, less energy may be required to charge a battery than through previous charging circuits, faster charging may be achieved, battery longevity improved, dendrite growth suppressed, and other advantages achieved. Aspects of the present disclosure may provide several such advantages, alone or in combination, relative to conventional charging. For example, the charging techniques described herein may reduce the rate at which an anode is damaged, may reduce heat generated during charging, which may have several follow-on effects such as reducing anode and cell damage, reducing fire or short circuit risks, and the like. In other examples, the charging techniques described herein may allow for higher charging rates to be applied to a battery and may thus allow for faster charging. Further, charge rates and parameters may be optimized to provide for a longer battery life and greater charging energy efficiency. In another example, such as through the application of the fast-charge 130, the disclosed systems and methods provide an improved balance of charge rate and battery life, while producing less heat.

In one example and to reduce the negative effects on the battery 108 due to pulse charging, the various embodiments discussed herein charge a battery of an electric vehicle 102 through an on-board charge shaping (or tuning) circuit. The charge shaping circuit may alter the charge signal received from the charging station 104 and/or the on-board charger 106 of the electric vehicle 102 based on one or more charge conditions at the battery 108, such as a charge signal that at least partially corresponds to a harmonic or harmonics associated with a minimum or relatively lower impedance of the battery. By controlling one or more frequency or harmonic attributes of the charge signal, the signal may charge the battery, directly or through regenerative braking charging, with greater efficiency (lower impedance) as compared to various conventional techniques, which may be accompanied by one or more of the various advantages discussed herein. The shaped or otherwise tuned charge signal as controlled by the charge shaping circuit may improve one or more aspects of charging of the vehicle battery 108. In one implementation, the charge shaping circuit may include generating control signals based on the charge signal algorithm. The control signals may, among other functions, shape the charge signal to approximate the shaped charge signal determined by the algorithm. In some instances, the shaped charge signal may be any arbitrarily shaped charge signal, such that the charge signal does not conform to conventional repeating charge signals, such as a repeating square wave or triangle wave charge signal where particular frequency of harmonic attributes of a given pulse are not controlled. In one instance, the charge signal is tuned to provide a particular attribute of the signal that has a frequency attribute reflective of an effect on impedance of that frequency attribute. For example, the shape of the charge signal may correspond to a harmonic associated with both the real and imaginary impedance value of the battery. In still another example, the charge signal may correspond to a harmonic associated with one or both of a conductance or susceptance of an admittance of the battery 108. In general, the charge signal shaping algorithm may sculpt or otherwise determine the shape of the charge signal based on any characteristics of the battery, either measured, modeled, or estimated.

In addition, many electric vehicles 102 provide for a regenerative power signal to be fed back to the battery 108 for charging while the vehicle is in a coasting or braking operating mode. In particular, the motor controller/inverter 110 may include circuitry that feeds power generated by the electric motor 112 back to the battery 108 during coasting or braking of the electric vehicle 102. This regenerative or feedback power may be used to recharge the battery 108. Conventionally, such a feedback charge signal is, at a high level, a DC current to the battery 108. The motor controller/inverter 110 of the electric vehicle 102 may include circuitry that is controllable to generate a shaped power signal in a similar manner as above, with or without the charge shaping circuit discussed above. A charge shaping controller of the electric vehicle 102 may provide one or more control signals to components of the motor controller/inverter 110 to shape the regenerative power signal from the motor 112 to the battery 108 during braking, thereby providing a more efficient regenerative charge signal as compared to conventional DC and other regen charge signals. The shaping of the regenerative charge signal may be any arbitrarily shaped charge signal and, in some instances, may be based on characteristics of the battery 108, such as the effect on impedance of energy transfer to the battery, although other battery characteristics are contemplated.

Figure 3:
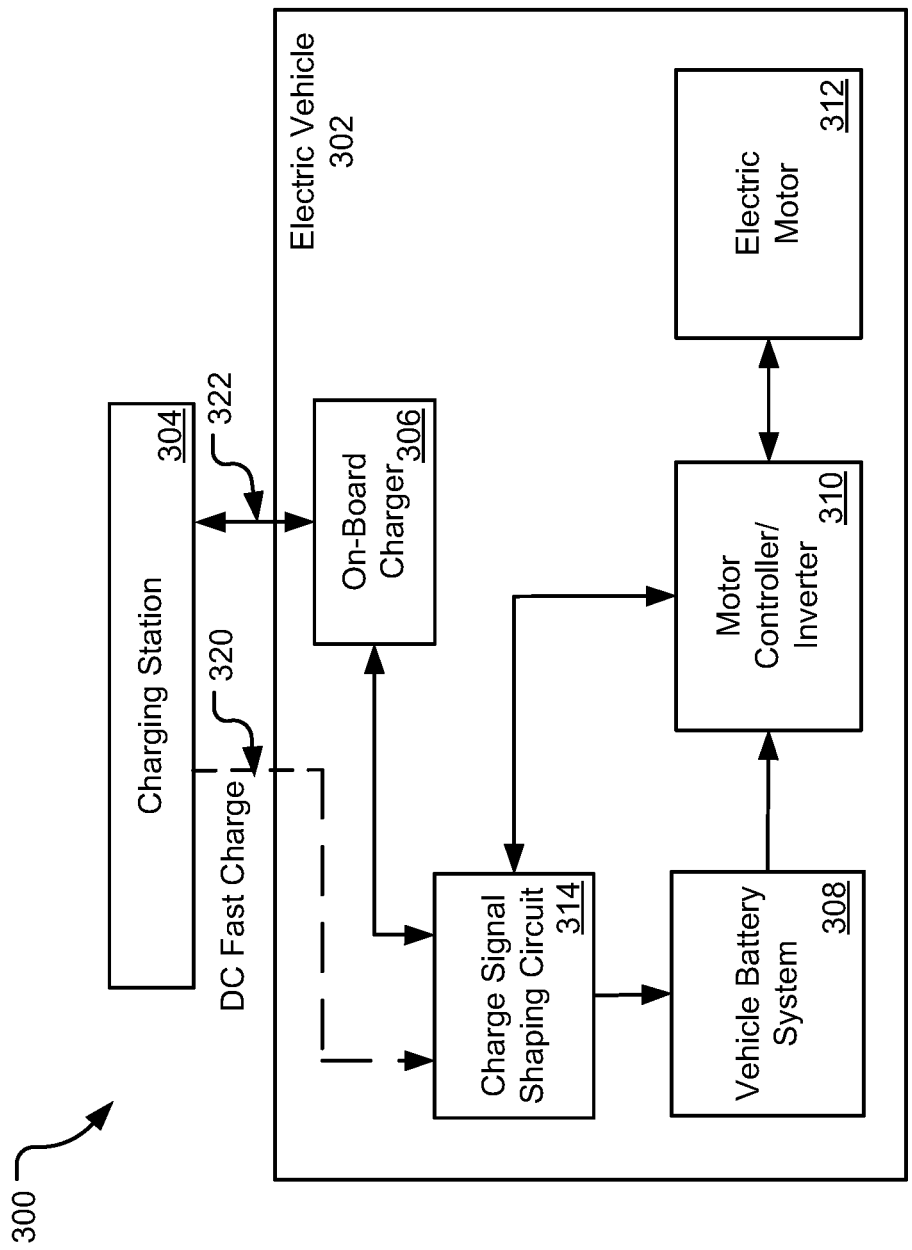
FIG. 3 is a second schematic diagram of a second electric vehicle charging system that utilizes a shaped charge signal in accordance with one embodiment.

FIG. 3 is a schematic diagram of an electric vehicle charging system 300 utilizing a tuned charge signal to charge the vehicle battery in accordance with one embodiment. Some of the components of the charging system 300 are similar to that described above with reference to FIG. 1A. For example, the electric vehicle 302 may include an on-board charging circuit 306 in communication with a charging station 304 to receive a charge signal 322. The charging circuit 306 may negotiate with the charging station 304 upon connection to request a voltage and/or current component of a power signal from the stationary charger. The charging station 304 may also provide a fast-charge signal 320, as negotiated by the on-board charger 306. The power signal 322 or the fast-charge signal 320 received from the charging station 304 may be a DC power signal or an AC power signal and may include one or more of the negotiated signal components. The amount of power available from the charging station 304 may vary based on the type of charging station 304, such as an at-home charging station or a publicly available charging station located in a parking lot. The on-board charging circuit 306 may provide an interface between the charging station 304 and the electric vehicle 302 that provides for different power signals that may be provided by the charging station depending on a negotiated value of a component of the signal. One or more communication lines may connect the charging station 304 and the charging circuit 306 to communicate one or more available power signals from the charging station for charging the battery 308 of the electric vehicle.

In general, the charging station 304 supplies the charge current that may be shaped or otherwise tuned and used to charge the battery 308 of the electric vehicle 302. In one particular implementation, the electric vehicle 302 may include a charge signal shaping circuit 314 to tune one or more aspects of a charge signal for use in charging the battery 308. In one example, the charge signal shaping circuit 314 may include a controller that provides one or more inputs to components of the charge signal shaping circuit to control the shaping of the charge signal from the on-board charger 306 or the fast-charge signal 320. In other examples, the on-board charging circuit 306 and/or the motor controller/inverter 310 may provide the control inputs to the charge signal shaping circuit 314. The control inputs may be used by the shaping circuit 314 to alter a signal from the charging station 304 into a more efficient power charging signal for the battery 308. The operation and composition of the charge signal shaping circuit 314 is described in more detail below.

In some instances, the charge signal shaping circuit 314 may alter energy from the charging station 304 to generate a charge signal that is shaped based on charge conditions at the battery 308, such as a charge signal that at least partially corresponds to a harmonic associated with a minimum or otherwise relatively lower impedance, as compared to other harmonics, or other characteristic value of the battery. In one example, the electric vehicle 302 may include a battery measurement circuit (not shown) connected to the battery 308 to measure battery voltage and/or charge current, as well as other battery attributes like temperature, and/or calculate the impedance, such as by using voltage and current measurements and any phase differences, across the terminals of the battery. In one example, battery characteristics may be measured based on the applied charge signal. In another example, battery characteristics may be measured as part of a routine that applies a signal with varying frequency attributes to generate a range of battery characteristic values associated with the different frequency attributes to characterize the battery, which may be done prior to charging, during charging, periodically during charging, and may be used in combination with look-up techniques, and other techniques. The battery 308 characteristics may vary based on many physical of chemical features of the battery, including a state of charge and/or a temperature of the battery. The various battery characteristic values measured during recharging of the battery, and among other times, may be provided to the charge signal shaping circuit 314 or other components of the vehicle 302.

Figure 4:
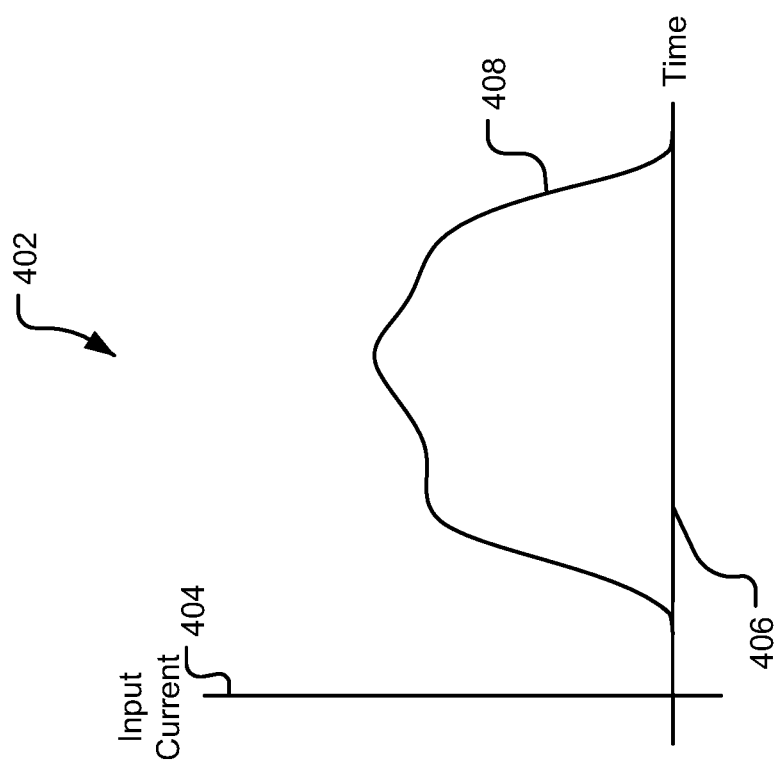
FIG. 4 is a signal graph of an example arbitrarily-shaped charge waveform for charging a battery in accordance with one embodiment.

Based on the battery characteristics, the charge signal shaping circuit 314 may shape or be controlled to shape the charge signal from the charging station 304 to generate an intended charge signal for efficient charging of the battery 308. For example, a real component of a measured impedance of the battery 308 may be used by the charge signal shaping circuit 314 to sculpt or share energy from the charging station 304 into one or more charge signals that correspond to a harmonic associated with a minimum real impedance value of the battery. As such, the charge signal shaping circuit 314 may execute a charge signal algorithm that outputs a charge signal shape based on measured or estimated charging conditions of the battery 308. In one instance, one or more components of the charge signal shaping circuit 314 may then generate one or more control signals that, among other functions, control other components of the circuit to shape the charge signal to approximate the shaped charge signal determined by the algorithm. In some instances, the shaped charge signal may be any arbitrarily shaped charge signal, such that the charge signal does not conform to a traditionally repeating charge signal, such as a repeating square wave or triangle wave charge signal. For example, FIG. 4 is a signal diagram 402 of an arbitrarily-shaped battery charging signal 400 for charging a battery. The signal diagram 402 illustrates a charge signal 408 graphed as input current 404 versus time 406. The shape of the charge signal 408 may be determined by a charge signal algorithm or program executed and/or implemented by charge signal shaping circuit 314. In one instance, the shape of the charge signal 408 may be based on characteristics of the battery 308, such as a minimum impedance value of the battery, although other battery characteristics are contemplated. For example, the shape of the charge signal 408 may correspond to a harmonic associated with both the real and imaginary impedance value of the battery. In still another example, the charge signal 408 may correspond to a harmonic associated with one or both of a conductance or susceptance of an admittance of the battery 308. In general, the charge signal shaping algorithm of the charge signal shaping circuit 314 may sculpt or otherwise determine the shape of the charge signal 408 based on any characteristics of the battery 308, either measured, modeled, or estimated. In one example, the leading edge of charge signal is shaped to conform to a harmonic associated with a relatively low impedance at the battery.

Further, as the characteristics of the battery 308 may change due to state of charge, temperature, and other factors, the shape of the charge signal 408 may also be changed over time. The charge signal shaping circuit 314 may therefore, in some instances, perform an iterative process of monitoring or determining characteristics of the battery 308 and adjust the shape of the charge signal 408 applied to the battery accordingly. This iterative process may improve the efficiency of the charge signal used to recharge the battery, thereby decreasing the time to recharge the battery, extending the life of the battery (e.g., the number of charge and discharge cycles it may experience), optimizing the amount of current charging the battery, and avoiding energy lost to various inefficiencies, among other advantages. One particular implementation of the charge signal shaping circuit 314 is described in greater detail in co-pending U.S. Nonprovisional patent application Ser. No. 17/232,975 titled "Systems And Methods For Battery Charging" and filed on Apr. 16, 2021, the entirety of which is incorporated by reference herein. Another particular implementation of the charge signal shaping circuit or otherwise methods for tuning the charge signal is describe in U.S. patent application Ser. No. 17/473,828 titled "SYSTEMS AND METHODS FOR HARMONIC-BASED BATTERY CHARGING," filed Sep. 13, 2021 and which is hereby incorporated by reference.

Figure 5:
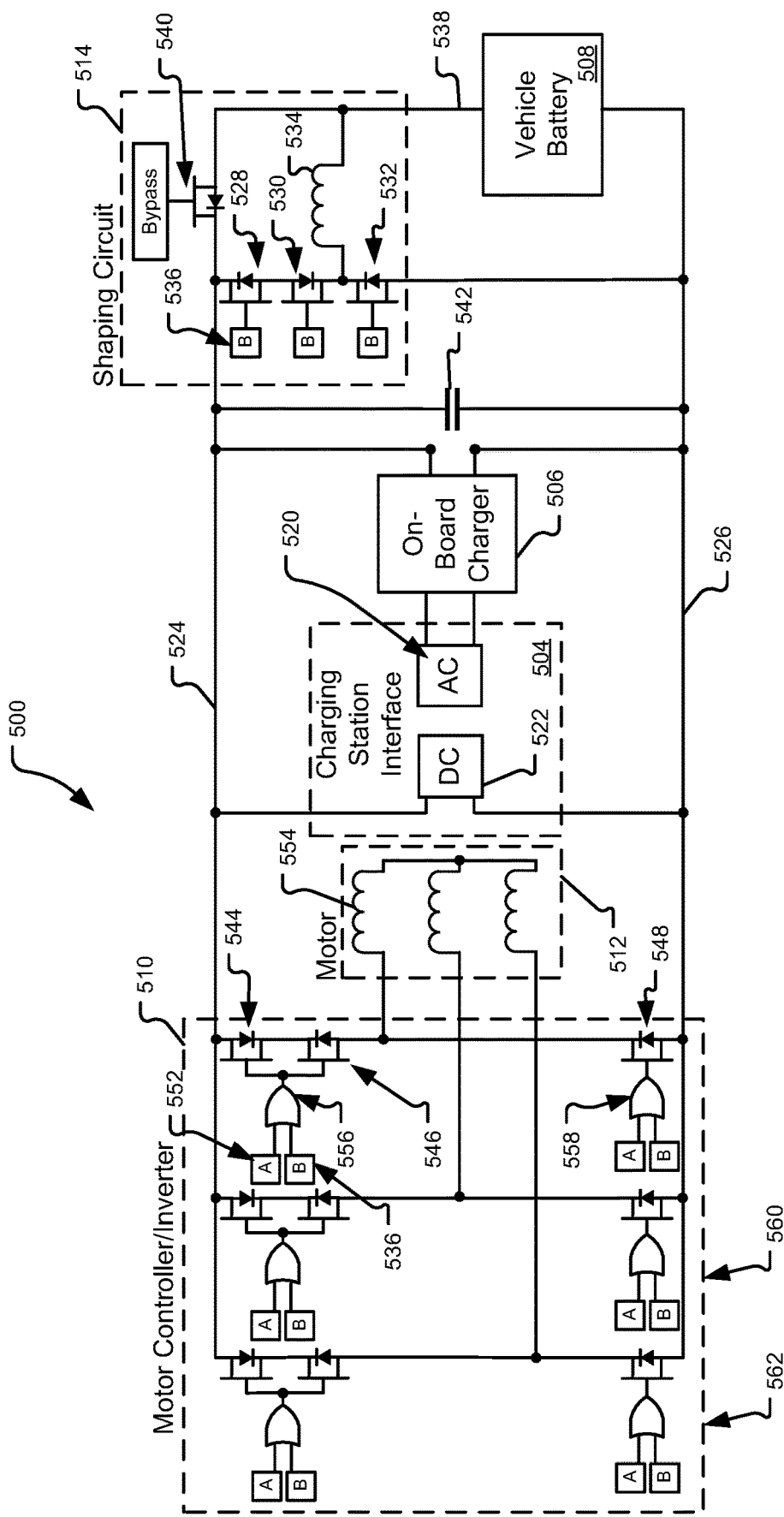
FIG. 5 is a schematic diagram illustrating a circuit for charging an electric vehicle battery system utilizing a shaped charge signal in accordance with one embodiment.

FIG. 5 is a schematic diagram illustrating a circuit 500 for charging an electric vehicle battery system utilizing a shaped charge signal in accordance with one embodiment. The circuit 500 includes elements described above with reference to the electric vehicle 302 of FIG. 3, including the negotiated power signal from the charging station received at a charging station interface 504, motor 512, and battery 508. The charging station interface 504 may include circuitry to communicate with a charging station 304 separate from the electric vehicle 302 to request a charge signal and/or receive the charge signal from the charging station. As described above, the charging station 304 may provide both a DC charge signal 522 (such as during a fast-charge operation) and an AC charge signal 520. As such, the charging station interface 504 may include components to request and receive both types of charge signals. The charging station interface 504 may, in some instances, include a charge cord and plug for connecting with the charging station 304. In other embodiments, the charging station 304 may include the charge cord and plug for seating with the interface 504 to provide the charging power. The DC charge signal 522 from the charging station may be provided directly to upper power rail 524 and lower power rail 526 for direct charging of battery 508. The AC charge signal 520 may be provided to on-board charger 506 before being provided to the upper power rail 524 and the lower power rail 526. As explained above, the on-board charger 506 may include an AC-DC converter circuit, among other circuits and functions.

The motor 512 illustrated in the circuit 500 is a three-phase electric motor, although other types of motors may be utilized within the circuit and/or the electric vehicle 302. The circuit 500 of FIG. 5 may be further include one or more of the components of circuit 300, such as a motor controller/inverter circuit 510 and a charge signal shaping circuit 514. Further and as described above, the charge signal for the battery 508 may be based on feedback measurements of the battery. As such, the circuit 500 may include a current sensor connected in series with the battery 508 and/or a voltage sensor connected in parallel with the battery. In general, any number of sensors for circuit performance measurements may be incorporated into the circuit for use in shaping the charge signal to the battery 508.

As mentioned, the circuit 500 may include one or more components to shape a charge signal for charging a battery 508. Such components may be incorporated into the charge signal shaping circuit 514 of the electric vehicle 302. In the particular implementation shown in FIG. 5, the circuit 500 may include a pair of switching elements, e.g., transistor 528 and transistor 530, and a second switching element, e.g., transistor 532, connected in series between the upper power rail 524 and the lower power rail 526. An inductor 534 may be connected between a drain node of transistor 530 and an electrode of the vehicle battery 508. In general and as described in more detail below, the switching elements 528-532 of the shaping circuit 514 may be controlled to shape an input charge signal to more efficiently charge the battery while reducing harmful effects on the battery.

In some instances, the first transistor pair 528,530 may be any type of transistors, e.g., a FET, or any other type of controllable switching element for controllably connecting the inductor 534 to the upper power rail 524. For example, a first transistor 528 of the transistor pair may be a FET with a drain node connected to the upper power rail 524, a source connected to a second transistor 530 of the pair, and a gate receiving a control signal. Similarly, the other transistor 530 of the pair may include a drain node connected to the inductor 534, a source connected to the source node of the first transistor 528 of the pair, and a gate receiving a control signal. The first transistor pair 528, 530 may receive a corresponding input signal (such as input signals) to operate the first transistor pair as a switching device or component. Although illustrated as a common source arrangement in circuit 500, first transistor pair 528, 530 may be configured as a common drain configuration, particularly if the transistors are a P type transistor in contrast to an N type transistor. In general, any of the transistors illustrated in the circuit 500 may be any type of switching device, with the paired transistors (such as transistor pair 528,530 or transistor pair 544,546) being arranged in a common drain or common source bidirectional configuration.

In one particular implementation, the input signal may be the same for both transistors 528, 530 of the transistor pair and may, in some instances, include a pulse-width modulation (PWM) control signal, although other control signals are contemplated. In one instance, the control signals may be generated from a circuit controller of the charge signal shaping circuit 514 (illustrated in FIG. 5 as box "B" 536). Thus, each gate node of the transistor pair 528, 530 may be connected to the shaping circuit controller 536 to receive a corresponding control signal. The control signals may be provided to both transistors 528, 530 of the transistor pair to control the operation of the first transistor pair as a switch that, when closed, connects the first inductor 534 to the upper power rail 524 such that the charge signal from the power rail flows through the first inductor. The second switching element 532 may receive a second input signal and may also be connected to the inductor 534. In some instances, the input signal to the second switching element 532 may be a PWM signal opposite of the control signal to the first transistor pair 528, 530. Thus, when the first transistor pair 528, 530 is closed to connect the inductor 534 to the upper rail 524, the second switching element 532 may be open. When the first transistor pair 528, 530 is open, conversely, the second switching element 532 may be closed, connecting the inductor 534 to the lower power rail 526 through the second switching element. Although the control signal to the first transistor pair 528, 530 and the control signal to the second switching element are described herein as opposing signals to control the transistors into opposing states, other techniques for controlling the switching elements 528-532 may also be implemented with the circuit 500. The inductor value, the time and frequency of actuating the transistors, and other factors can be tailored to generate a waveform and particularly a waveform with controlled harmonics to the battery 508 for charging the same.

Through control of the first transistor pair 528, 530 and the second switching element 532 via the input signals, the charge signal on the upper rail 524 may be shaped into any arbitrary form. For example, the charging station interface 504 may provide the DC fast-charge signal 522 to the upper rail 524 to charge the vehicle battery 508. In another example, the on-board charger 506 may provide an altered AC charge signal 520 from the charging station interface 504. Further, the elements of the shaping circuit 514 may be controlled to shape the charge signal present on the upper rail 524 to charge vehicle battery 508. For example, by activating the second switching element (transistor 532) and deactivating the first transistor pair 528, 530, current may not flow into inductor 534, flattening an output current from the inductor to the charge the battery 508. Alternatively, activating the first transistor pair 528, 530 and deactivating the second switching element 532 causes current from the inductor 534 to increase. The control of the switching elements 528-532 may be based on a shaping algorithm such that the charge signal 538 may be shaped to be more efficient in charging the battery 508, resulting in shorter charge time and a longer battery life. In one example, the charge signal 538 may be shaped based on charge conditions at the battery 508, such as a charge signal that at least partially corresponds to a harmonic associated with a minimum real impedance or other characteristic value of the battery as obtained from the voltage sensor and/or the current sensor.

In another example, a real component of a measured impedance of the battery 508 may be used to generate the control signals to sculpt or share energy from the charge signal 538 into one or more charge signals that correspond to a harmonic associated with a minimum real impedance value of the battery. One particular implementation of the control of the switching elements is described in greater detail in co-filed U.S. Nonprovisional patent application Ser. No. 17/473,828 titled "Systems And Methods For Harmonic-Based Battery Cell Charging" and filed on Sep. 13, 2021, the entirety of which is incorporated by reference herein.

It should be appreciated that more or fewer components may be included in shaping circuit 514 or charge circuit 500 in general. Rather, the circuit 500 of FIG. 5 is but one example of a simple battery charging circuit 500 and the techniques described herein for utilizing a charge signal shaping circuit 514 for shaping a charge signal may apply to any number of battery charging circuits. For example, a circuit controller may be in communication with one or more components of the circuit 500 to provide one or more control signals to shape a current or voltage signal from the charge signal. For example, a controller 536 may provide the input signals to switching elements 528-532 to control the operation of the elements and shape a charge signal 538 to the vehicle battery 508. The circuit controller may be implemented through a Field Programmable Gate Array (FPGA) device, a microcontroller, an Application-Specific Integrated Circuit (ASIC), or any other programmable processing device. In one implementation, the circuit controller may include a charge signal shaping generator to determine the shape of the charge signal to be applied to the battery 508.

Charge signal shaping circuit 514 may further include a bypass switch 540 to switch the circuit 500 from a battery charging mode to a vehicle operating mode. In one implementation, the bypass switch 540 may be a FET-type transistor with a source node connected to the upper rail 524, a drain connected to an electrode of the vehicle battery 508, and a gate node receiving a bypass signal from a controller. Other types of controllable switching elements may also be used as the bypass switch 540. During a charging of the vehicle battery operation, the bypass switch 540 may receive a signal to open the bypass switch such that the charge signal 538 received at the battery 508 is shaped through control of the switching elements 528-532 of the shaping circuit 514. To provide power from the battery 508 to the motor 512 during a vehicle operating mode, a bypass input signal may be provided bypass switch 540 to close the switch and allow the battery power to bypass the shaping elements of the shaping circuit 514. Thus, through control of the bypass switch 540, a shaped power signal may be provided to charge the vehicle battery 508 during charging and the battery may provide the necessary power to operate the motor 512 of the vehicle.

In some implementations, a capacitor 542 may be connected between the upper power rail 524 and the lower power rail 526. The capacitor 542 may, in some instances, store power from the upper rail 524 for use in charging the vehicle battery 508 during periods of time in which a charging power is not provided through the charging station interface 504. The capacitor 542 may instead provide power to the upper power rail 524 and lower power rail 526 for shaping by the shaping circuit 514 similar to the power provided by the on-board charger 506 and/or charging station interface 504.

In addition to shaping a charge signal received from the charging station 304 through the charging station interface 504, the circuit 500 may also include one or more components to aid in shaping a regenerative or feedback charge signal from the motor 512 to the battery 508. As described above, many electric vehicles provide for a regenerative power signal to be fed back to the battery 508 for intermittent charging while the vehicle is braking, idling, or otherwise not receiving power from the vehicle battery 508. Generally, such a feedback charge signal is a DC power signal provided from the motor 512 to the upper power rail 524 such that the regenerative power signal may be shaped by the charge signal shaping circuit 514 as described above. In particular, during braking or other vehicle operation modes, the bypass switch 540 may be controlled to open such that power on the upper rail 524 is conducted through the switching elements 528-532 and the inductor 534 of the shaping circuit 514. The switching elements 528-532 may be controlled to shape the DC regenerative charge signal provided by the motor 512. When power from the battery 508 is requested to operate the motor 512, the bypass switch 540 may be closed such that power from the battery may be provided to the motor. In this manner, the regenerative charge signal may similarly be shaped by the shaping circuit 514 during braking that corresponds to a shaping algorithm as implemented by the controller 536.

Many electric vehicles include a motor controller/inverter circuit 510 to control the rotation speed of the motor 512. In particular, an upper switching element, such as transistor 544, and a lower switching element, such as transistor 548, may be controlled to convert the DC signal received from the vehicle battery 508 to an AC power signal to the motor 512 through a PWM control signal applied to the gates of the transistors 544, 548. In addition to controlling the motor, the inverter circuit 510 may also be used to shape the regenerative charge signal from the motor 512 in a similar manner as above. In particular, the inverter circuit 510 may include switching elements arranged similar to those of the shaping circuit 514 such that shaping of the charge signal to the battery 508 may utilize components of the inverter circuit 510, the shaping circuit 514, and/or a combination of the inverter and shaping circuits.

In one example illustrated in FIG. 5, a pair of inverter switching elements, e.g., transistor 544 and transistor 546 may be connected in series to a first motor inductor 554 corresponding to a first phase of the motor 512. Although not illustrated, it should be appreciated that each of the inverter switching elements include a body diode characteristic, as those of ordinary skill in the art would recognize. The inverter switching elements 544, 546 may be connected in series with a corresponding second inverter transistor 548. Control of the inverter switching pair 544, 546 and the corresponding second inverter transistor 548 may convert the DC signal from the battery 508 to an AC motor control signal. More particularly, a first transistor 544 of the inverter transistor pair may include a drain node connected to a drain node of the second transistor 546 of the pair, a source connected to the upper power rail 524, and a gate receiving a control signal, such as from an inverter controller (illustrated in FIG. 5 as box "A" 552). The other transistor 546 of the inverter pair may include a drain connected to the drain of the first transistor 544 of the inverter pair, a source connected to a first motor inductor 554 associated with a first phase of the motor 512, and a gate receiving a control signal. The corresponding second inverter transistor 548 may include a drain connected to the first motor inductor 554, a source connected to the lower power rail 526, and a gate receiving an input control signal.

Through control signals provided by inverter controller 552, a power signal from the battery 508 and to the motor 512 may be controlled. For example, the inverter switching elements 544-548 may be controlled by an inverter controller 552 to convert the DC battery signal 522 into a step-wise AC motor controller signal, such as through a pulse-width modulation (PWM) control signal applied to the gates of the transistors 544-548. In one implementation, the control signals to the transistors 544-548 may be from a logic component connected between the inverter controller 552 and the transistors, such as logic OR gate 556 and 558. The transistors 544-548 may also be used to control over the flow of current from the motor 512 to the battery 508 and from the battery to the motor, depending on an operating condition of the vehicle. For example, control signals from the inverter controller 552 may cause current to flow in a first direction through the elements (e.g., from the upper rail 524 to the motor 512) to power the motor or in a second direction through the elements (e.g., from the motor 512 to the upper rail 524) to provide the regenerative power to the battery 508.

In addition to controlling the power to the motor 512 and the regenerative charge signal to the battery 508, the inverter components may also be utilized to shape the regenerative charge signal in a similar manner as described above with relation to the charge shaping circuit 514. For example, the inverter switching pair 544, 546 may be controlled in a similar manner to the pair of switching elements 528, 530 of the shaping circuit 514 such that the inverter switching pair may be similarly controlled as described above to shape a regenerative charge signal from the motor 512. Further, the second inverter transistor 548 of the inverter circuit 510 may be controlled in a similar manner to the second transistor 532 of the shaping circuit 514 as described above to shape a regenerative charge signal from the motor 512. To use the transistors 544-548 of the inverter circuit 510 to shape the regenerative charge signal, the gate inputs of the transistors may be connected to the shaping circuit controller 536 through OR gate 556 and OR gate 558. The input signals may include a pulse-width modulation (PWM) control signal, although other control signals are contemplated. In general, however, the control signals may be generated from the shaping circuit controller 536, a controller 552 of the motor controller/inverter circuit 510, or any other component of the electric vehicle 302. Control signals may be provided to both transistors of the inverter transistor pair 544, 546 to control the operation of the inverter transistor pair as a switch that, when closed, connects the first motor inductor 554 to the upper power rail 524 such that the charge signal from the motor inductor 560 flows to the battery. The second inverter transistor 548 may receive a second input signal (from the inverter controller and/or the shaping circuit controller) such that, when the inverter transistor pair 544, 546 is closed, the second inverter transistor 548 is open. In a manner similar to that described above, the control of the transistors 544-548 of the inverter circuit 510 may operate to shape the regenerative charge signal from the motor 512 to the battery 508 during regenerative charging.

When using the inverter transistors 544-548 to shape the regenerative charge signal from the motor 512, the switching elements of the shaping circuit 514 may be controlled to provide a direct path to the inductor 534 and the vehicle battery 508. For example, transistor pair 528, 530 may be controlled to a closed operation such that the charge signal on the upper rail 524 may be provided to the input of the inductor 534 to generate the shaped charge signal 538 for use in charging the vehicle battery 508. Further, transistor 532 of the shaping circuit 514 may be open such that the inductor 534 is connected in series to the upper rail 524. The bypass switch 540 may also be opened during regenerative charging. Control of the switching elements of the shaping circuit 514 may be provided by the shaping circuit controller 536, the inverter controller 552, or any other controller component of the electric vehicle. Through use of the components charge circuit 500, a shaped charge signal may be controlled by the components of the shaping circuit 514, the inverter circuit 510, or both. Further, one or more charge signals from a charging station and/or a regenerative charge signal may be shaped by the charge circuit 500.

Although discussed above with relation to one phase of the motor 512, the circuit 500 may include similar circuits for other phases of the motor 512. For example, charge signal shaping components may be incorporated for a second phase of the motor 512 and separate components 562 for a third phase of the motor. In general, any number of components may be included for a motor 512 of any number of phases. Regardless of the number of phases, each set of components may be configured to sculpt or shape a charge signal from the motor 512 fed back to the battery 508 during regenerative braking of the electric vehicle to improve the efficiency of the regenerative charge signal and prolong the life of the battery 508.

In some implementations, the switching elements (i.e., transistors) of the inverter circuit 510 may be controlled during regenerative charging of the vehicle battery 508 to pre-shape the charge signal from the motor 512 to remove large fluctuations in the charge signal. In particular, the transistors 544-548 of the inverter circuit 510 may be controlled by the inverter controller 552 and/or the shaping circuit controller 536 to filter out fast-occurring changes in the charge signal from the motor 512 before the charge signal is transmitted on the upper power rail 524. The shaping circuit 514 may then be controlled to further shape the charge signal on the upper power rail 524 based on the algorithm executed by the shaping circuit controller 536 or other device of the vehicle. Filtering of the large fluctuations from the regenerative charge signal from the motor 512 may improve the effectiveness of the shaping circuit 514 to further shape the charge signal based on the algorithm executed by the controller 536.

Figure 6:
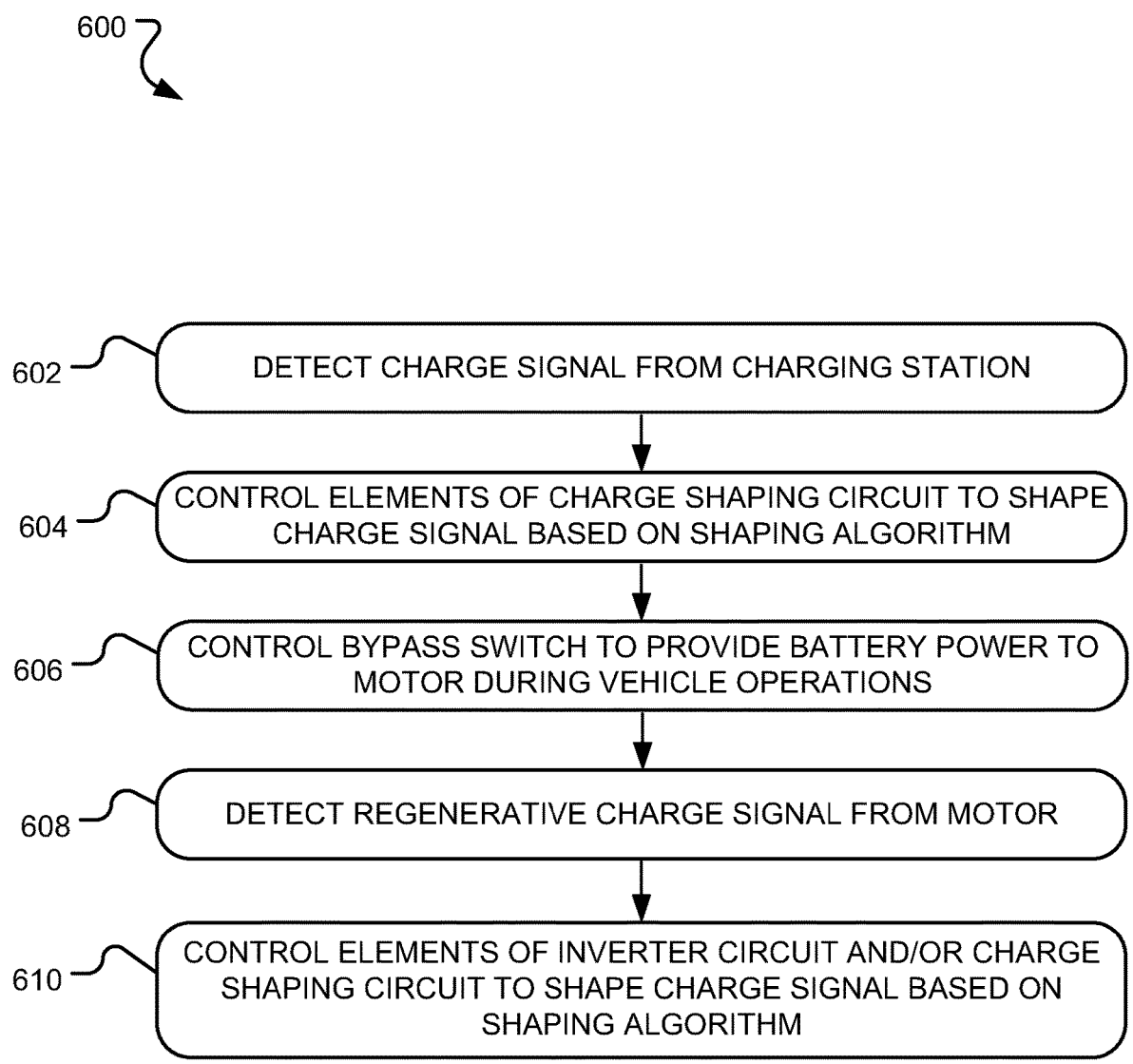
FIG. 6 is a flowchart of a method for controlling a charging circuit of an electric vehicle battery system utilizing a shaped charge signal in accordance with one embodiment.

FIG. 6 illustrates a flowchart of a method for controlling a charging circuit of an electric vehicle battery system utilizing a shaped charge signal in accordance with one embodiment. At operation 602, a charging circuit may detect or receive an indication of a charge signal received from a charging station 304, such as through a charging station interface 504. The charging signal may be a DC fast-charge signal, an AC charge signal, a charge signal from an on-board charger 506, or any other type of charge signal generated by a charging station. At operation 604, one or more elements of a charge shaping circuit 514 may be controlled to shape the charge signal for use in charging the vehicle battery 508. For example and as explained above, one or more switching elements (such as transistors 528-532) may receive a control signal from a shaping circuit controller 536 to shape at least a portion of the charge signal. The shaping circuit 514 may also include an inductor for shaping of the charge signal. The control of the switching elements 528-532 may be based on a shaping algorithm executed by a controller, such as the shaping circuit controller 536. The algorithm may include instructions to shape the charge signal based on one or more characteristics of the vehicle battery 508, such as a harmonic associated with both the real and imaginary impedance value of the battery, a harmonic associated with one or both of a conductance or susceptance of an admittance of the battery 108, or any other characteristics of the battery, either measured, modeled, or estimated.

At operation 606, the bypass switch 540 of the charging circuit 500 may be closed to allow power from the charged vehicle battery 508 to the motor 512 via the motor controller/inverter circuit 510. The bypass switch 540 may be closed during driving operations of the vehicle. At operation 608, the charging circuit may detect or receive an indication of a regenerative charge signal from the motor 512 to the battery 508. As described above, during braking or other driving operations of the electric vehicle, energy stored in the motor may be used to charge the vehicle battery 508. In response to the regenerative charge signal, elements of the inverter circuit 510 and/or the shaping circuit 514 may be controlled to shape the regenerative charge signal. For example, the bypass switch 540 may be opened. In addition, the transistors 544-548 of the inverter circuit 510 and/or the transistors of the shaping circuit 528-532 may be controlled (such as by a shaping circuit controller 536 or an inverter controller 552) as described above to shape the regenerative charge signal. In this manner, both the charge signal from a charging station and the regenerative charge signal from the motor 512 may be shaped by the inverter circuit 510, shaping circuit 514, or both circuits.

In one implementation, the same or a similar shaping algorithm may be applied to discharging the battery 308 of the electric vehicle 302. In particular, the discharge of the battery 308 to provide power to the motor 312 of the vehicle 302 may be controlled based on the characteristics of the battery 308. Shaping the charge signal may be done with a buck circuit or boost circuit, alone or in various possible combinations, distinctly from a charge function. In one example, similar benefits realized by harmonically shaping an input charge signal to an electrochemical device may be realized through shaping an output signal from the electrochemical device to a load. In one example, the output harmonics may be associated with a low or lowest impedance delivering power from the battery 308. In some instances, the output impedance may be assumed to be the same, or substantially the same, as the input impedance under the same conditions of the electrochemical device— e.g., under some state of charge, temperature, life cycle of the battery, etc. In other instances, the output impedance may be measured or characterized distinctly from the input impedance under different conditions, and the distinct measurements or characterization then used to select an optimal output harmonic. An impedance measurement circuit may be used to measure output impedance from the load at different frequencies in the same way as relative to measure input impedance to the battery. Regardless, in various examples, an output signal from the battery 308 may be shaped, and in particular examples, the leading edge of the output signal may be harmonically shaped. The optimal harmonic is associated with a value representative of a flow of electrical current to or from an electrochemical device, depending on whether we are discussing charge or discharge (delivering power from the electrochemical device).

In addition, it has been observed that optimal battery charging/discharging occurs when the battery temperature is between 10 degrees C. and 40 degrees C. Thus, in some instances, the electric vehicle may include one or more heat transfer systems or components to transfer heat generated from the battery charging system 100 to the battery 108 based on a measured temperature of the battery or a battery environment. For example, the on-board charge shaping circuit may include components that generate heat when charging of the battery occurs. A heat transfer system may transfer that heat to the battery 108 to raise the temperature of the battery to within an ideal temperature range and improve the efficiency of the battery charging and prolong the battery life.

Returning to FIG. 3, one or more heat transfer systems may be contained within the electric vehicle 302 for raising the temperature of the battery 308 to within an ideal temperature range for charging. In one example, the charge signal shaping circuit 314 may include components that generate heat when charging of the battery occurs. A heat transfer system may operate to transfer that heat to the battery 308 to raise the temperature of the battery to within an ideal temperature range. Such a heat transfer system may include circulated air or a liquid that is heated by the components of the charge signal shaping circuit (or other components of the electric vehicle 302) and transferred near the battery 308. For air transfer, one or more fans may blow the heated air into a chamber in which the vehicle battery 308 is located. For liquid transfer, water or other fluid may be pumped from an environment near the on-board charge shaping circuit to near the battery 308. The transfer of the heat to the battery may be based on a temperature measurement of the battery itself or an environment of the battery. For example, the heat transfer system of the electric vehicle 302 may be operated to transfer heat to the battery 308 if the measured temperature of the battery or an environment around the battery falls below a threshold value. Similarly, the heat transfer system may be controlled to stop the transfer of heat if the measured temperature of the battery 308 or environment exceeds an upper threshold value. In this manner, the heat transfer system may be controlled to maintain the battery 308 temperature within a range of temperatures for improved battery charging.

Further, one or more of the components of the charge signal shaping circuit 314 (or any other component of the electric vehicle 302) may be controlled to generate heat if a transfer of heat is detected as desired for battery charging. For example, one or more transistors of the charge signal shaping circuit 314 may be controlled, through one or more control signals, to operate at or near a saturation level to generate heat which may then be transferred to the vehicle battery 308. Operating these components at a heat-generating level may continue until the battery temperature is within a target range of temperatures. In this manner, the components of the charge signal shaping circuit 314 may include multiple operating states, at least one of which is a heat-generating operating state.

Figure 7:
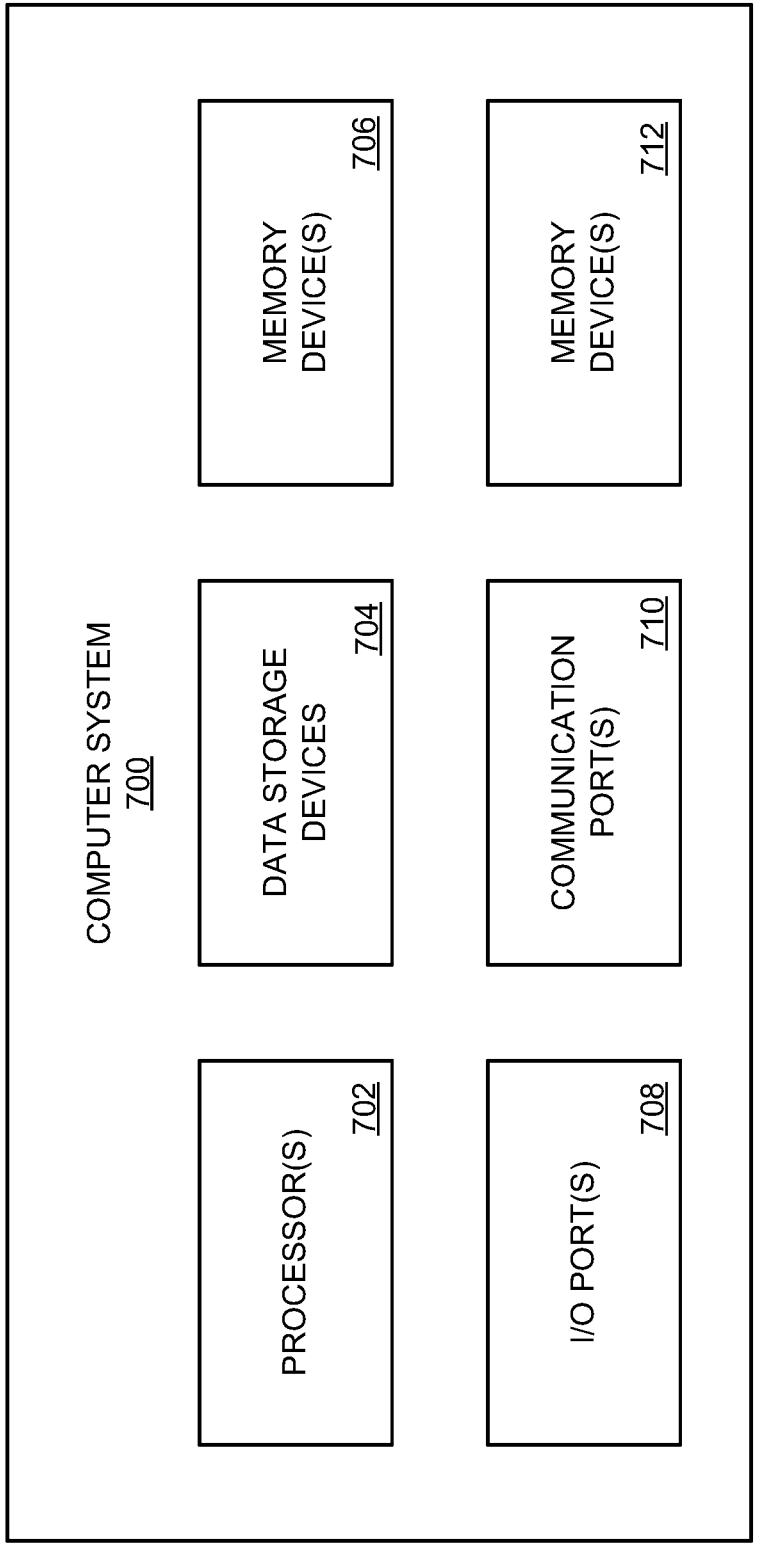
FIG. 7 is a diagram illustrating an example of a computing system which may be used in implementing embodiments of the present disclosure.

Referring to FIG. 7, a detailed description of an example computing system 700 having one or more computing units that may implement various systems and methods discussed herein is provided. The computing system 700 may be part of a controller, may be in operable communication with various implementation discussed herein, may run various operations related to the method discussed herein, may run offline to process various data for characterizing a battery, and may be part of overall systems discussed herein. For example, the computing system 700 may be part of the shaping circuit controller 536 and/or the inverter controller 552 discussed above. The computing system 700 may process various signals discussed herein and/or may provide various signals discussed herein. For example, battery measurement information may be provided to such a computing system 700. The computing system 700 may also be applicable to, for example, the controller and/or the tuning/shaping circuits discussed with respect to the various figures and may be used to implement the various methods described herein. It will be appreciated that specific implementations of these devices may be of differing possible specific computing architectures, not all of which are specifically discussed herein but will be understood by those of ordinary skill in the art. It will further be appreciated that the computer system may be considered and/or include an ASIC, FPGA, microcontroller, or other computing arrangement. In such various possible implementations, more or fewer components discussed below may be included, interconnections and other changes made, as will be understood by those of ordinary skill in the art.

The computer system 700 may be a computing system that is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 706, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7. Similarly, in various implementations, various elements disclosed in the system may or not be included in any given implementation.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The presently described technology in various possible combinations may be implemented, at least in part, in software stored on the data stored device(s) 704, stored on the memory device(s) 706, and/or communicated via one or more of the ports 708-712, thereby transforming the computer system 700 in FIG. 7 to a special purpose machine for implementing the operations described herein.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random-access memory (DRAM), static random-access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700. The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. In some examples, such inputs may be distinct from the various system and method discussed with regard to the preceding figures. Similarly, the output devices may convert electrical signals received from computing system 700 via the I/O port 708 into signals that may be sensed or used by the various methods and system discussed herein. The input device may be an alphanumeric input device, including alphanumeric and other keys for communicating information and/or command selections to the processor 702 via the I/O port 708.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as battery voltage, open circuit battery voltage, charge current, battery temperature, light, sound, temperature, pressure, magnetic field, electric field, chemical properties, and/or the like.

In one implementation, a communication port 710 may be connected to a network by way of which the computer system 700 may receive network data useful in executing the methods and systems set out herein as well as transmitting information and network configuration changes determined thereby. For example, charging protocols may be updated, battery measurement or calculation data shared with external system, and the like. The communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate with one or more other machines, either directly over a point-to-point communication path, over a wide area network (WAN) (e.g., the Internet), over a local area network (LAN), over a cellular (e.g., third generation (3G), fourth generation (4G), fifth generation (5G)) network, or over another communication means.

The computer system 700 may include a sub-systems port 712 for communicating with one or more systems related to a device being charged according to the methods and system described herein to control an operation of the same and/or exchange information between the computer system 700 and one or more sub-systems of the device. Examples of such sub-systems of a vehicle, include, without limitation, motor controllers and systems, battery control systems, and others.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments, also referred to as implementations or examples, described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment", or similarly "in one example" or "in one instance", in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

We claim:

1. A system for charging an electrochemical device of an electric vehicle, the system comprising:
a charge signal shaping circuit receiving a charge signal via a charge station interface and controlling a shape of the charge signal for the electrochemical device of the electric vehicle based on an obtained harmonic associated with a value representative of a flow of electrical current to the electrochemical device.

2. The system of claim 1 further comprising:
a regenerative charge signal shaping circuit receiving a feedback charge signal from a motor of the electric vehicle and controlling a shape of the feedback charge signal for the electrochemical device based on the obtained harmonic.

3. The system of claim 1 wherein the charge signal shaping circuit receives a regenerative charge signal from a motor of the electric vehicle, the charge signal shaping circuit controlling a shape of the regenerative charge signal based on the obtained harmonic associated with the value representative of the flow of electrical current to the electrochemical device.

4. The system of claim 1 wherein the charge signal received via the charge station interface is a negotiated charge signal comprising a direct current (DC) charge signal received from the charge station interface.

5. The system of claim 1 wherein the charge signal received via the charge station interface is a negotiated charge signal comprising a direct current (DC) charge signal converted from an alternate current (AC) charge signal by an on-board charger circuit.

6. The system of claim 1 wherein the charge signal shaping circuit comprises:
paired switching devices connected in series between a power rail and one or more shaping inductors, the one or more shaping inductors in electrical communication with an electrode of the electrochemical device of the electric vehicle.

7. The system of claim 6 wherein the charge signal shaping circuit further comprises:
a second switching device in electrical communication between the one or more shaping inductors and a second electrode of the electrochemical device of the electric vehicle.

8. The system of claim 7 wherein the charge signal shaping circuit further comprises:
a controller transmitting a first control signal to the paired switching devices and a second control signal to the second switching device to shape the charge signal for the electrochemical device of the electric vehicle based on the obtained harmonic associated with the value representative of the flow of electrical current to the electrochemical device.

9. The system of claim 1 wherein the charge signal shaping circuit comprises:
a bypass switching device configurable to open during charging of the electrochemical device of the electric vehicle and to close during a driving operation of the electric vehicle.

10. The system of claim 1 further comprising:
a heat transfer system conducting heat generated from the charge signal shaping circuit to the electrochemical device based on a measured temperature of the electrochemical device and a target range of operating temperatures of the electrochemical device.

11. A method for charging an electrochemical device of an electric vehicle, the method comprising:
receiving, from a charge station interface of the electric vehicle in electrical communication with a charge station, an electrochemical device charge signal; and
controlling a shape of the charge signal for the electrochemical device of the electric vehicle based on an obtained harmonic associated with a value representative of a flow of electrical current to the electrochemical device.

12. The method of claim 11 wherein controlling the shape of the charge signal comprises:
transmitting a first control signal to paired switching devices of a charge shaping circuit; and
transmitting a second control signal to a second switching device of the charge shaping circuit.

13. The method of claim 12 wherein the first control signal and the second control signal are a pulse-width modulation signal based on an algorithm associated with the value representative of the flow of electrical current to the electrochemical device.

14. The method of claim 11, further comprising:
controlling a bypass switch to prevent current flow through the bypass switch during a charging operative state of the electric vehicle and to allow current flow through the bypass switch during a driving operative state of the electric vehicle.

15. The method of claim 11 wherein the charge signal is received via an on-board charging circuit.

16. The method of claim 11, further comprising:
receiving a regenerative charge signal from a motor of the electric vehicle; and
controlling a shape of the regenerative charge signal based on the obtained harmonic associated with the value representative of the flow of electrical current to the electrochemical device.

17. The method of claim 16 wherein controlling the shape of the regenerative charge signal comprises:
transmitting a first control signal to paired switching devices of a charge shaping circuit; and
transmitting a second control signal to a second switching device of the charge shaping circuit.

18. The method of claim 16 wherein controlling the shape of the regenerative charge signal comprises:
transmitting a first control signal to paired switching devices of an inverter circuit; and
transmitting a second control signal to a second switching device of the inverter circuit.

19. The method of claim 16 wherein controlling the shape of the regenerative charge signal comprises:
controlling elements of an inverter circuit to pre-shape the regenerative charge signal; and
controlling elements of a charge shaping circuit to further shape the regenerative charge signal.

20. The method of claim 11 wherein controlling the shape of the charge signal for the electrochemical device of the electric vehicle is executed by a shaping circuit controller circuit or a motor controller circuit.

21. The method of claim 11, further comprising:
conducting heat generated from controlling the shape of the charge signal to the electrochemical device based on a measured temperature of the electrochemical device and a target range of operating temperatures of the electrochemical device.

* * * * *